(12) United States Patent
Reed

(10) Patent No.: US 12,279,107 B2
(45) Date of Patent: Apr. 15, 2025

(54) SYSTEM AND METHOD FOR OBFUSCATING LOCATION OF A MOBILE DEVICE

(71) Applicant: ADVANCED ENTERPRISE SOLUTIONS, LLC, Leesburg, VA (US)

(72) Inventor: Sean Alan Reed, Leesburg, VA (US)

(73) Assignee: ADVANCED ENTERPRISE SOLUTIONS, LLC, Leesburg, VA (US)

( * ) Notice: Subject to any disclaimer, the term of this patent is extended or adjusted under 35 U.S.C. 154(b) by 0 days.

(21) Appl. No.: 17/575,432

(22) Filed: Jan. 13, 2022

(65) Prior Publication Data

US 2022/0225085 A1    Jul. 14, 2022

Related U.S. Application Data

(60) Provisional application No. 63/137,395, filed on Jan. 14, 2021.

(51) Int. Cl.
*H04W 12/02* (2009.01)
*H01Q 1/52* (2006.01)
(Continued)

(52) U.S. Cl.
CPC ............ *H04W 12/02* (2013.01); *H01Q 1/526* (2013.01); *H04W 4/024* (2018.02); *H04W 4/029* (2018.02)

(58) Field of Classification Search
CPC ..... H04W 12/02; H04W 4/024; H04W 4/029; H04W 4/02; H04W 4/38; H04W 88/02; H04W 24/08; H04W 12/63; H04W 12/12; H01Q 1/526; G01S 2205/01; G01S 5/0226; G01S 19/48; G01S 19/015; G01S 17/42; G01S 7/497; G01S 19/42; G01S 7/40

See application file for complete search history.

(56) References Cited

U.S. PATENT DOCUMENTS 9,635,547 B1 *   4/2017  Mincher ............... H04W 4/029
10,749,612 B1 *  8/2020  Lannotti ............... H04B 1/005
(Continued)

OTHER PUBLICATIONS

International Search Report and Written Opinion mailed Apr. 21, 2022 issued in PCT/US2022/012358.

*Primary Examiner* — Alison Slater
*Assistant Examiner* — Jing Gao
(74) *Attorney, Agent, or Firm* — HOGAN LOVELLS US LLP

(57) ABSTRACT

A system and a method for obfuscating a mobile device's location are provided. For privacy or security reasons, the user of a mobile device may desire to prevent the mobile device from reporting the mobile device's true location. To prevent a mobile device from determining its location accurately, an RF enclosure encapsulates the mobile device and prevents the mobile device from receiving RF signals from sources outside of the enclosure. Within the enclosure, antenna modules broadcast RF signals, such as cellular-network signals, Wi-Fi signals, Bluetooth signals, or GPS signals, that contain information associated with a user-selected target location. The mobile device receives the RF signals from the antenna modules and determines that it is located at the target location rather than the true location.

14 Claims, 9 Drawing Sheets

(51) Int. Cl.
*H04W 4/024* (2018.01)
*H04W 4/029* (2018.01)

(56) References Cited

U.S. PATENT DOCUMENTS

| | | | | |
|---|---|---|---|---|
| 11,184,762 B1* | 11/2021 | Messer | .............. | G01C 21/3605 |
| 2003/0083839 A1* | 5/2003 | Boswell | ............... | G01R 31/002 |
| | | | | 702/117 |
| 2012/0196644 A1* | 8/2012 | Scherzer | ............... | H04W 72/02 |
| | | | | 455/524 |
| 2013/0147686 A1* | 6/2013 | Clavin | ................. | G02B 27/017 |
| | | | | 345/8 |

* cited by examiner

SYSTEM AND METHOD FOR OBFUSCATING LOCATION OF A MOBILE DEVICE

CROSS REFERENCE OF RELATED APPLICATIONS

This application claims the benefit of U.S. Provisional Application No. 63/137,395 filed on Jan. 14, 2021 and hereby incorporates by disclosure thereof in its entirety.

FIELD OF THE INVENTION

The present invention is directed to a system and method for masking the true location of a mobile device without limiting the functionality or operability of the device. In particular, the system and method are directed to an area shielded from external radio frequency ("RF") signals, and broadcasting RF signals that replicate those at a selected remote location to the mobile device within the RF-shielded area such that mobile device receives and transmits signals that make it appear as it if were at the remote location.

BACKGROUND

Mobile devices often utilize their locations to provide navigation, mapping, weather, and other location-based services. A mobile device has many methods of ascertaining the device's location to facilitate providing these functions. Common methods of determining a mobile device's location include using a satellite-based radionavigation service (including Global Position System (GPS), among others), using cell-tower triangulation (or trilateration or multilateration), detecting Wi-Fi or Bluetooth® signals in the device's vicinity that have known locations, tracing the device's IP addresses when connected to the Internet, and detecting movement with accelerometers or gyroscopes. Such methods of determining a mobile device's location may result in the device storing a history of the device's location or communicating the mobile device's location to third parties, both of which may implicate a user's privacy and security if the device's location approximates the user's location.

Thus, a user may desire to obfuscate the device's location while using it. Traditional methods of obfuscating a device's location may involve turning off the device's location-determining functionality, blocking the device from receiving electromagnetic signals, routing the device's connection to the Internet through a virtual private network (VPN), and turning off the device or the device's Wi-Fi, Bluetooth, or cellular radios. When a given method of determining a device's location is inhibited, such as when a device cannot detect to a GPS satellite signals, the device often can rely on the other methods of determining location to ascertain the device's location. So, a user would need to inhibit all of the device's methods of determining location to prevent the device from determining its location. But doing this presents multiple problems. If a user does this, the device's connectivity and usability could also be inhibited. And the device could be able to detect that one or more of its location-determining functionalities had been inhibited. Software-based methods of obfuscating a mobile device's location may involve using certain location-obfuscating applications to provide false location information to the mobile device's location services at the software level. However, this method may be less desirable for some users because certain applications on the mobile device may be able to detect these location-obfuscating applications.

To maintain user privacy and security, it is beneficial to obfuscate the device's location-determining functionality in a manner that is not detectable by the mobile device. Thus, a method to obfuscate a device's location without interfering with a user's operation of the device or allowing the mobile device to detect that the location is being obfuscated is needed.

SUMMARY OF THE INVENTION

The present invention is directed to a system and method to allow a user to have their mobile device present itself, when in use, as being at a location that it is not located at. An environment or enclosure which is shielded from external radio-frequency (RF) signals is provided, so that no external signals are received or detected by the mobile device and no RF signals are sent directly from the mobile device that can be received by external systems. The user selects one or more locations remote from their actual physical location at which the user would like the mobile device to present as its location. A computer system and associated hardware retrieve information regarding the RF signals the mobile device would detect and use if it were at the remote location, and broadcast RF signals into the RF-shielded area that replicate the RF signals at the remote location. For example, the mobile device may use one or more of cellular, Wi-Fi, GPS, and Bluetooth® while the user operates the mobile device to conduct activities such as making calls or otherwise communicating with external devices, accessing the internet, utilizing mapping and navigation applications, and executing mobile applications. In order to prevent the data associated with these activities from revealing the true location of the mobile device, the computer system may retrieve information regarding the RF signals the device would see if it were at the selected remote location from a database. A processor in the computer system may then execute software modules that use this signal information from the database to replicate the RF signals at the remote location and provide them to one or more antennas included within the RF-shielded area. These antennas are included within the RF-shielded environment but are isolated from external RF signals. These antennas then broadcast the false, replicated RF signals to the mobile device within the RF-shielded area, and the mobile device interacts with these replicated signals when performing operations. These replicated signals include data segments that identify them as originating from the false, remote location selected by the user.

With the mobile device in the RF shielded environment, the replicated RF signals containing the false location data are broadcast to the mobile device and the mobile device then reports the false location as its real location when in use. The antennas not only broadcast the false, replicated RF signals to the mobile device to use when operating, but also relay outcoming RF communications from the mobile device to external sources such that the mobile device can be fully functional to the user within the RF-shielded area while presenting itself as being in the remote location. In this way, the user can operate the mobile device and their actual location will be masked. Instead of being able to determine the true location from the RF signals and associated data used in operating and interacting with the applications and programs, the mobile device itself would only receive the broadcast replicated signals containing information related to the remote location. Thus, all activity from the mobile device that is transmitted back to the antennas will be based on this false location data, and the mobile device will therefore be presenting itself as it is at the false location. In addition, the signals provided to the mobile device while it is in the RF shielded environment can change over time, replicating RF signals the mobile device would detect and interact with if it were moving at the selected remote location or even traveling from one selected remote location to another.

BRIEF DESCRIPTION OF THE DRAWINGS

Various embodiments in accordance with the present disclosure will be described with reference to the drawings, in which.

DETAILED DESCRIPTION

The present invention is directed to systems and methods for masking the location of a mobile device without requiring modifications to device itself. For example, the system and method may allow for a user to select a location remote from where the user is physically located, and the mobile device in use will appear as if it is at that remote location, thus masking the true location of the user to those monitoring the activity of the mobile device. The system and method include providing an area that is free from external RF signals, such as cellular signals, Wi-Fi signals, Bluetooth® signals, and satellite signals. The mobile device is contained within this environment or enclosure, and in order for the device to be operative, hardware including radios and antennas are used to replicate the signals from a remote location, and these replicated signals are broadcast to the mobile device within the environment or enclosure. By interacting with the replicated signals, the mobile device can be fully functional to the user within the RF-shielded area while presenting itself as being at the remote location.

When the user selects a remote location, or series of remote locations, at which the user wants the mobile device to appear, a computer system implementing software modules accesses a signal database containing information regarding the RF signals the mobile device would detect if it were at the remote location or locations. The computer provides this remote location signal information from the database to software modules that replicate the RF signals. The software modules then send the replicated signals to antennas, which transmit the signals into the RF-shielded area containing the mobile device. Thus, the mobile device can have full functionality, including internet activity and use of mobile applications, and the mobile device will report its location as being the selected remote location. And the true location of the mobile device is masked and without requiring any modifications to the mobile device itself.

Figure 1A:
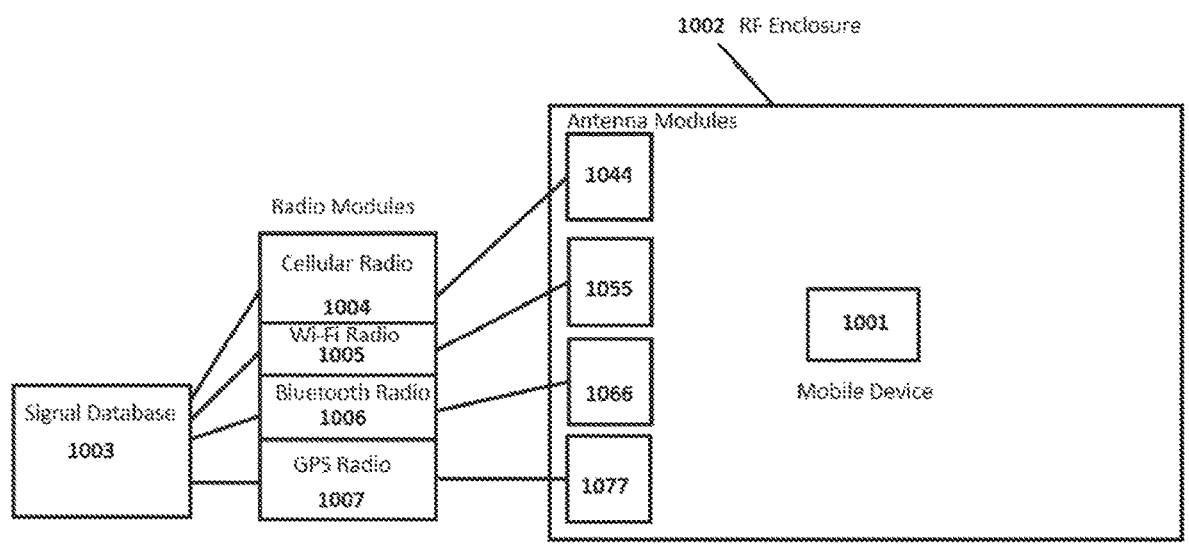
FIG. 1A illustrates an example of a system capable of obfuscating a mobile device's location in a shielded room.

FIG. 1A illustrates a system for masking, or obfuscating, a mobile device's 1001 location while still allowing full operability of the device. A mobile device may be any device that is capable of wireless signals, including devices that receive wireless signals, transmit wireless signals, or both transmit and receive wireless signals. These wireless signals may be, for example, RF signals such as cellular signals, Wi-Fi signals, Bluetooth® signals, GPS or other satellite signals, or other RF signals that a device may receive or transmit to other devices or systems while in use. These RF signals typically contain information from which the location of the mobile device is readily apparent or could be determined. For example, the cellular signals often contain data bits, packets, or other information identifying the cellular tower from which the signals are transmitted or to which the signals will be sent. As another example, the Wi-Fi signals from wireless routers or hotspots may identify the relevant network's name (SSID), IP address, MAC address, BSSID, signal strength, or other information regarding the source of the signals that would be associated with a particular area or location. The Bluetooth signals from Bluetooth devices or beacons may include information such as the relevant device or network's name (SSID), IP address (if available), MAC address, BSSID, signal strength, and other information regarding the source of the signals that would be associated with a particular area or location. And, GPS allows a device to determine its location (and thus transmit or represent this location in mobile applications or internet activity) by on monitoring the signals received from multiple satellites, and calculating position based on times of arrival of the signals from the various satellites. Thus, a mobile device that is not shielded from external RF signals would detect RF signals from these sources, and potentially communicate with the sources, thereby allowing others to track user activity and determine the device's location.

The system and method described herein allow a user, without modifying the mobile device itself, to mask the true location of the device by creating an environment shielded from external RF signals. By selectively broadcasting replicated RF signals to the device while it is in the RF-shielded area, the mobile device can be made to report its location as being a selected remote location.

The system for obfuscating location includes a RF enclosure 1002 that prevents RF signals from entering the enclosed area containing the device 1001. A signal database 1003 in communication with a computer system executing one or more software-defined or hardware radio modules 1004, 1005, 1006, 1007 is provided. The radio modules, based on data and information from the signals database, generate replicated RF signals from a selected remote location, and provide them to antenna modules 1044, 1055, 1066, 1077, that then broadcast these replicated signals into the enclosure. The antenna modules may be mounted or included within the RF-shielded enclosure in any way. If extra gain is desired for one or more of the antenna modules, in order to boost the signals, the antenna modules may be mounted to a piece of heavy metal contained within the RF-shielded enclosure.

The RF enclosure may be, for example, a room, a designated area within a room, a portable enclosure, or any other enclosure that may contain the mobile device to be operated. The RF enclosure shields the mobile device from external RF signals. This RF shielding may be accomplished by, for example, using Faraday cage or an anechoic chamber, or constructing the enclosure from materials that reflect, absorbs, or otherwise block RF signals. The RF enclosure may also be, for example, a room or container having walls of a requisite thickness to block, absorb, or reflect RF signals. The degree of RF shielding required for the RF enclosure may depend on where the enclosure is located. If the RF enclosure is located in an isolated location that has minimal RF signals, the degree of RF shielding may be less than in a location with a greater magnitude of RF signals. For example, an RF enclosure in a rural location may require less shielding to block radio signals from entering the enclosure than a location in a city. The RF enclosure 1002 may be small enough that it cannot fit more than the mobile device and one or more antenna modules 1044, 1055, 1066, 1077. The enclosure may be large enough that the user of the mobile device can be present within the enclosure itself, or the enclosure may be dimensioned so that it contains the mobile device to be shielded without encompassing the entire body of the user. In such a situation, the user may interact with the mobile device while it is in the enclosure through, for example, a user interface, openings to allow the user's hands into the interior of the enclosure without allowing external RF signals to also enter, or by using RF shielded gloves. The RF enclosure may be large enough to contain an entire building, vehicle, or other large object. In one embodiment, the RF enclosure is within a shipping container. The RF enclosure may also be within a vehicle, such as a van or the trailer of a semi-truck. Moreover, more than one mobile device, and more than one mobile device user, may be contained with the RF enclosure. When multiple devices are in the enclosure, each device will report its location as being the same remote location. The location of more than one device can be masked so that multiple devices all appear to be at a selected remote location by putting them all into the same enclosure, or by putting the devices into different enclosures that broadcast the same replicated signals.

The RF enclosure may also be configured to simulate motion of the mobile device, such that the mobile device's accelerometers or gyroscopes will produce the same output as if the mobile device were moving, either by being carried by a person, in a vehicle, or through other means. The RF enclosure may accomplish this motion-simulation effect by including a rocker arm or other mechanism that physically moves the mobile device in a manner that an accelerometer or gyroscope on the mobile device would register as motion. This motion-simulation functionality can also prevent the mobile device from detecting movement if the RF enclosure itself is in motion, such that the mobile device's accelerometers or gyroscopes will produce the same output as if the mobile device were stationary.

One or more antenna modules 1044, 1055, 1066, 1077 are located within the RF enclosure 1002 to broadcast replicated signals to the mobile device 1001. Each of these antennas is capable of broadcasting replicated, simulated RF signals. The simulated RF signals may include cellular network signals, such as signals that comply with a cellular standard (GSM, CDMA, UMTS, 4G LTE, 5G, 6G, or other standard); Wi-Fi network signals, such as signals based on the IEEE 802.11 family of standards (802.11, 802.11b, 802.11a, 802.11g, 802.11n, 802.11ac, 802.11ax, or other standard); Bluetooth signals, and satellite-based radionavigation service signals (such as GPS, GLONASS, BDS, and Galileo signals, among others). As used here, "GPS" refers to satellite-based radionavigation services generally and not only to the Global Positioning System.

For example, a first antenna module 1044 may be configured to broadcast one or more cellular network signals. A second antenna module 1055 may be configured to broadcast one or more Wi-Fi network signals. A third antenna module 1066 may be configured to broadcast one or more Bluetooth signals, such as Bluetooth low-energy signals from Bluetooth beacons. A fourth antenna module 1077 may be configured to broadcast one or more GPS signals. In this way, the functionality of the mobile device is not limited in any way, and the device would not present conflicting locations if, for example, it was only fed a simulated Wi-Fi signal without also receiving simulated cellular and GPS signals. Each of the antenna modules can be configured to broadcast signals to simulate multiple sources of RF signals. For example, the first antenna module may broadcast a first cellular network signal to simulate a first cellular network tower and broadcast a second cellular network signal to simulate a second cellular network tower, either simultaneously or by alternating between broadcasting each signal.

The plurality of antenna modules may be separate modules for each type of RF signal or a single antenna module having one or more antennas that broadcasts all of the desired simulated RF signals. The antenna modules may also be configured to receive RF signals from the mobile device 1001. For example, an antenna module 1044, 1055, 1066, 1077 may be configured to receive one or more RF signals, including the same type of RF signal from the mobile device that it broadcasts.

One or more radio modules 1004, 1005, 1006, and 1007 produce simulated RF signals, are connected to the antenna modules 1044, 1055, 1066, 1077, and transmit the simulated RF signals to the antenna modules. The radio modules 1004, 1005, 1006, and 1007 may also be configured to receive RF signals transmitted to the antenna modules from the mobile device 1001. The RF signals received by the radio modules may contain data from the mobile device. This data may be formatted in a communications protocol, such as Internet Protocol (IP) or another protocol. The radio, or a general-purpose computer connected to the radio, may convert this data to or from a preferred communications protocol (such as to or from IPv4 or IPv6) before relaying the data to another device or network, such as the Internet. The radio modules may be software-defined and configured to be operable with a general-purpose computer. The radio modules may also be special-purpose hardware that are configured to produce a specific signal. If the radio modules are external to the enclosure, the connection between the radio modules and antenna modules must pass through the RF enclosure, such as by wires configured to pass through RF-shielded ports in the RF enclosure. Although not intended to be limited in theory, because of RF shielding on the RF enclosure, the connection between the radio modules and antenna modules is typically by wire, optical fiber, laser optical signal, or other means that can penetrate into the RF enclosure. The radio modules may also be within the enclosure itself, along with the antennas, with an external connection to the signal database 1003.

The antenna modules and radio modules may be configured to relay communication data from the mobile device to a network such as the Internet or mobile application servers. The communication data may be transmitted to the Internet through a virtual private network (VPN), and the VPN may route the communication data to a server located at or near the target location such that the mobile device's IP address will be consistent with being located at or near the target location. The VPN may alternatively route the communication through one or more server at a location that is remote to the target location. The traffic to and from the VPN may also be encrypted. The simulated RF signals produced by the radio modules 1004, 1005, 1006, 1007 and broadcasted by antenna modules 1044, 1055, 1066, 1077 correspond to a particular target geographic location in that the simulated signals are the same as signals that are detectable at the target location. The simulated RF signals are thus simulated in the sense that the signals are recreating signals that are detectable at the target location. And based on the simulated RF signals, a mobile device can determine that it is located at the target location.

For example, a simulated cellular network signal contains the same identifying information that a cellular network signal at the target location contains, including Cell Global Identity (CGI) information. A simulated Wi-Fi network signal contains the same identifying information that a Wi-Fi network signal at the target location contains, such as the network SSID, name, channel, network frequency, MAC address, BSSID, among other identifying information. A simulated Bluetooth signal contains the same identifying information that a Bluetooth signal at the target location contains, such as the identifying information from a local Bluetooth beacon, including the beacon's MAC address or name. A simulated GPS signal contains the same identifying information that a GPS signal at the target location contains, such as the constellation of GPS satellites that are detectable at the target location and the signals that would be received from each of the plurality of detectable satellites. The RF signals may also vary in strength depending on the simulated distance from each simulated source, which may be accomplished with a variable attenuator to adjust the broadcasted power of the RF signal. The attenuator may be incorporated into an antenna module 1044, 1055, 1066, 1077, into the radio modules, 1004, 1005, 1006, 1007, or into a wire connecting a radio module with an antenna module. As a result, the mobile device will have a Received Signal Strength Indicator (RSSI) that corresponds with the simulated location.

Thus, cell-tower-based location methods (such as triangulation, trilateration, or multilateration) based on the simulated RF signals would determine that the mobile device is located at the target location. Likewise, Wi-Fi-based location methods based on the simulated RF signals would determine that the mobile device is located at the target location. Bluetooth-based location methods based on the simulated RF signals would determine that the mobile device is located at the garget location. And GPS-based location methods based on the simulated RF signals would determine that the mobile device is located at the target location. Accordingly, all of the mobile device's location-determination methods would simultaneously determine that the mobile device is located at the target location. The location-determination methods may operate by receiving identifying information from the simulated RF signals and querying a database that specifies where each RF signal source is located. For example, a location-determination application may use an API to query the location (such as a latitude and longitude combination) of an RF-signal source having a particular SSID.

The radio modules 1004, 1005, 1006, 1007 generate the simulated RF signals based on location signal data stored in a signal database 1003. The location signal data contains information about signals that correspond to target geographic locations. The location signal data may include information from which the an RF signal at the target geographic location can be simulated, such as information about the cell-tower signals, Wi-Fi signals, Bluetooth signals, and GPS signals detectable at the target location (including signal strength, RSSIs, MAC IDs, CGI information, channel, encryption, SSIDs, BSSIDs, GPS identifying information, ANQP information, among other information). The databases may collect and store the information regarding RF signals present at remote locations and execute a software script that selects from among this information based on which location a user selects as the one the user wants to appear at. For example, the database may contain some or all of the location signal data regarding the different RF signals that would be present at one or more remote locations at different times of the day or year, or at different areas within a location (such as different rooms within a hotel, office, or conference center). Depending on which location a user selects, and the time it would be at that remote location, the database may retrieve the appropriate RF signal information for the radio modules to generate the appropriate replicated RF signals into the enclosure area.

Figure 1B:
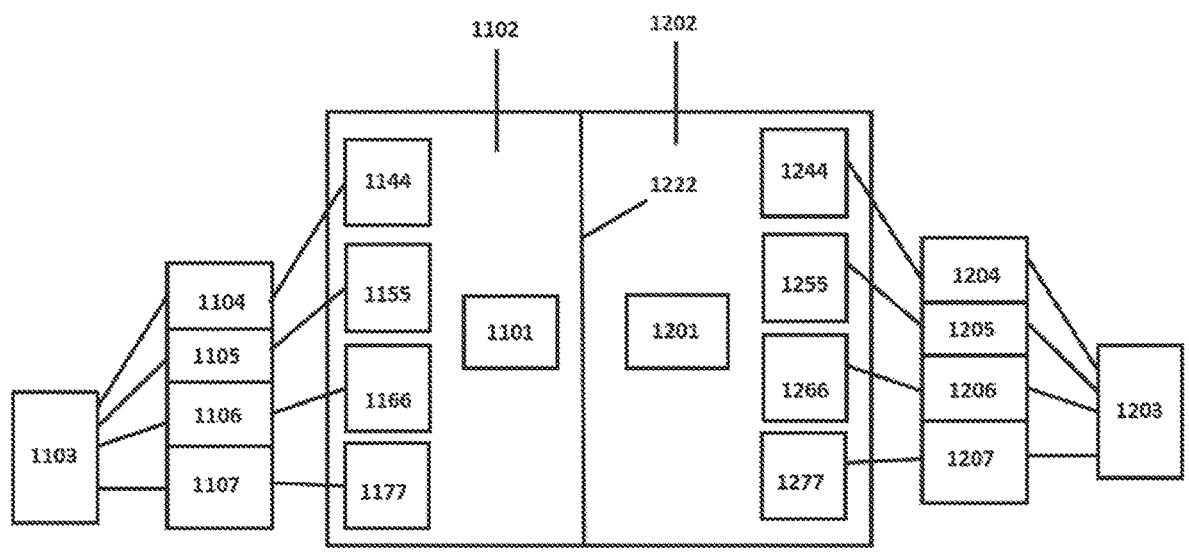
FIG. 1B illustrates an example of a system capable of obfuscating the locations of a plurality of mobile devices that are each within a separate shielded room.

As shown in FIG. 1B, the system may include multiple RF for obfuscating the location of a first mobile device 1101 and the location of a second mobile device 1201. The system shown in FIG. 1B is similar to the system of FIG. 1A in that it shows an RF enclosure 1102 containing a first mobile device 1101 and a first set of one or more antenna modules 1144, 1155, 1166, 1177. The first set of one or more antenna modules broadcast simulated RF signals that are generated by and transmitted to the antenna modules from radio modules 1104, 1105, 1106, 1107. The RF signals correspond with a target location that a user would like the first mobile device 1101 to determine as that device's location. The radio modules generate the simulated RF signals based on location signal data that corresponds with a target location from a signal database 1103. The system shown in FIG. 1B also includes a second RF enclosure 1202 containing a second mobile device 1201 and a second set of one or more antenna modules 1244, 1255, 1266, 1277. Between the first RF enclosure 1102 and the second RF enclosure 1202 is an RF-shielding barrier 1222. The RF-shielding barrier separates the RF enclosures 1102, 1202 from each other and shields each RF enclosure from the RF signals present in the other RF enclosure. The RF-shielding barrier may be any barrier that blocks, reflects, absorbs, or otherwise shields from RF signals. And the RF-shielding barrier may be RF-shielded by the same mechanisms by which the RF enclosure described in relation to FIG. 1A is RF-shielded.

The second set of one or more antenna modules broadcast simulated RF signals that are generated by and transmitted to the antenna modules from a second set of one or more radio modules 1204, 1205, 1206, 1207. The radio modules 1104, 1105, 1106, 1107, 1204, 1205, 1206, 1207 may be connected to a single computer or multiple computers. The RF signals correspond with a target location that a user would like the first mobile device 1201 to determine as the device's location. The radio modules generate the simulated RF signals based on location signal data that corresponds with a target location from a signal database 1203. The second signal database 1203 may contain the same data as the first signal database 1103, and one signal database may be accessed by each of the first and second sets of radio modules. The second signal database 1203 may alternatively be the same as the first signal database 1103. While first and second enclosures and corresponding antenna modules, software modules, and databases are shown, it should be understood that any number of separate enclosures may be created that are separated by RF-shielding barriers within a given location.

Figure 1C:
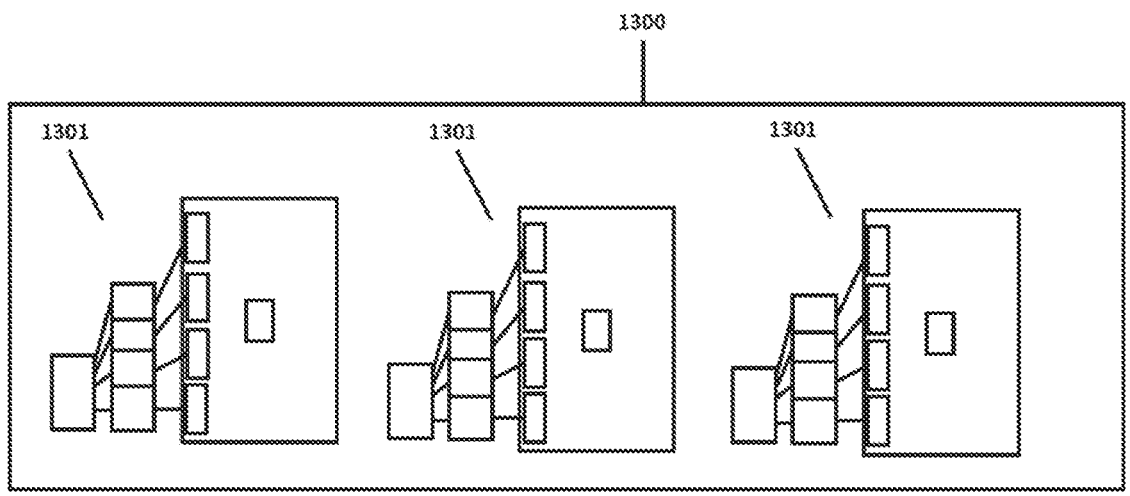
FIG. 1C illustrates the system for obfuscating mobile devices' locations having three enclosure systems 1301 contained within an external enclosure room 1300.

FIG. 1C illustrates the system for obfuscating mobile devices' locations having three enclosure systems 1301 contained within an external enclosure room 1300. Each enclosure system 1301 may be, for example, the system shown in FIG. 1A. The external enclosure room may be RF-shielded by one or more of the same mechanisms by which the RF enclosure described in relation to FIG. 1A is RF-shielded. The RF enclosures of the three systems 1301 may be approximately the size of phone booths for individual users to obfuscate their locations while remaining within the external enclosure room 1300. If the external enclosure room 1300 is RF-shielded, users can move between the RF enclosure rooms of the systems 1301 so that their mobile devices detect a change in location from the first system 1301 to another.

Figure 2:
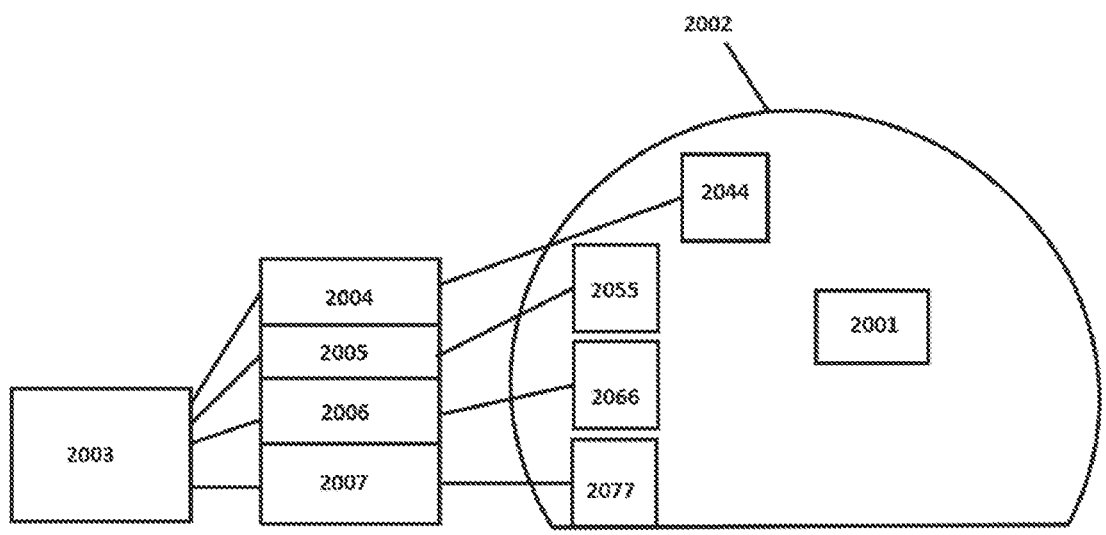
FIG. 2 illustrates an example of a system capable of obfuscating a mobile device's location within a shielded tent.

FIG. 2 illustrates another embodiment of a system for obfuscating a mobile device's 2001 location. The system shown in FIG. 2 is similar to the system of FIG. 1A in that it shows a mobile device 2001 and one or more antenna modules 2044, 2055, 2066, 2077. The one or more antenna modules broadcast simulated RF signals that are generated by and transmitted to the antenna modules from radio modules 2004, 2005, 2006, 2007. The RF signals correspond with a target location that a user would like the mobile device 2001 to determine as the device's location. The radio modules generate the simulated RF signals based on location signal data that corresponds with a target location from a signal database 2003. In FIG. 2, the antenna modules 2044, 2055, 2066, 2077 and the mobile device 2001 are located within an RF enclosure tent 2002. The RF enclosure tent prevents RF signals from entering the tent, and may be made of, for example, a fabric, plastic, or other flexible material having RF-shielding materials woven therein or connected thereto. The RF enclosure tent may accomplish this through the same mechanisms as the RF enclosure room of FIG. 1A. The RF enclosure tent is also collapsible such that it can be folded to a smaller size when in use. Thus, the RF enclosure tent may be moved from place to place and deployed for temporary use. The RF enclosure tent may include support posts, allowing a user to set up an RF-shielded area within the tent of sufficient size to contain both the user and the mobile device.

Figure 3:
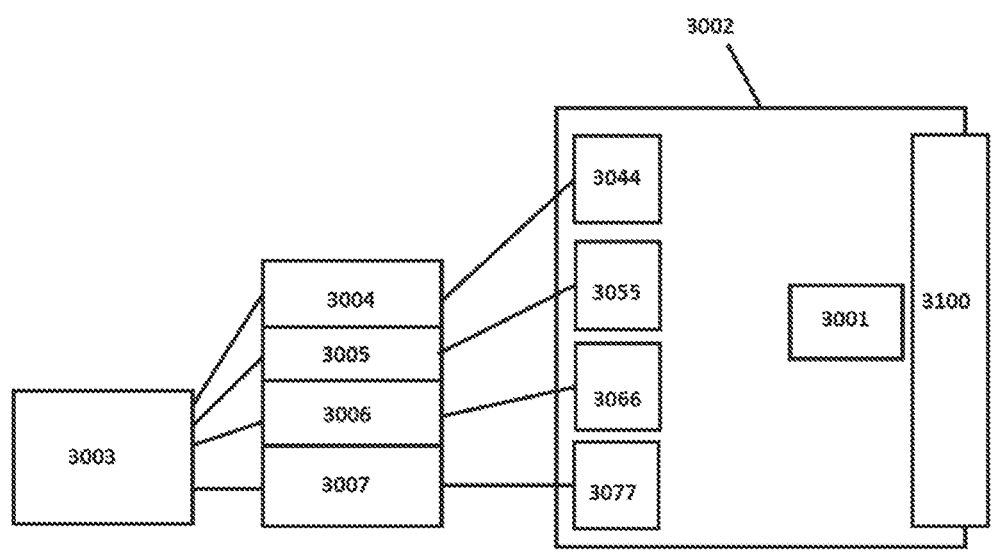
FIG. 3 illustrates an example of a system capable of obfuscating a mobile device's location within a portable shielded compartment.

FIG. 3 illustrates a system for obfuscating a mobile device 3001's location, wherein the RF enclosure is a portable RF enclosure compartment 3002 dimensioned to be carried by a user. For example, the RF enclosure compartment 3002 may be the size of a briefcase or backpack. The system includes a mobile device 3001 and one or more antenna modules 3044, 3055, 3066, 3077. The one or more antenna modules broadcast simulated RF signals that are generated by and transmitted to the antenna modules from radio modules 3004, 3005, 3006, 3007. The RF signals correspond with a target location that a user would like the mobile device 3001 to determine as the device's location. The radio modules generate the simulated RF signals based on location signal data that corresponds with a target location from a signal database 3003. The antenna modules 3044, 3055, 3066, 3077 and the mobile device 3001 are located within an RF enclosure compartment 3002. The RF enclosure compartment 3002 prevents RF signals from entering the compartment. The RF enclosure compartment may accomplish this through the same mechanisms as the RF enclosure room of FIG. 1A. The RF enclosure compartment may be small, around the size of a briefcase or laptop case, or smaller, for maximum portability. The RF enclosure compartment may additionally integrate a portable power source, such as a battery.

The RF enclosure compartment may also be configured to simulate motion of the mobile device, such that the mobile device's accelerometers or gyroscopes will produce the same output as if the mobile device were moving, either by being carried by a person, in a vehicle, or through other means. The RF enclosure compartment may accomplish this motion-simulation effect by including a rocker arm or other mechanism that physically moves the mobile device in a manner that an accelerometer or gyroscope on the mobile device would register as motion. This motion-simulation functionality can also prevent the mobile device from detecting movement if the RF enclosure compartment itself is in motion, such that the mobile device's accelerometers or gyroscopes will produce the same output as if the mobile device were stationary.

A user may not be able to fit entirely within the RF enclosure compartment 3002, so the compartment includes an interface 3100 through which a user may interact with the mobile device 3001. The interface may be capable of providing output to and receiving input from a user, by one or more of a touchscreen display, buttons, and a non-touchscreen display. The interface may be connected to the mobile device 3001 by a wired connection or other communication medium, such as RF signals, optical signals, or infra-red signals. The interface may be a portion of a Faraday cage through which a user can see the mobile device. The interface may alternatively be a hole or opening such that a user can plug a wire into the mobile device from outside the RF enclosure compartment 3002 or reach his or her arm into the compartment to use the device. If the interface is a hole or opening, the hole or opening may be covered by a flap or zipper compartment that forms part of a faraday cage such that the RF enclosure compartment 3002 remains RF-shielded while a user reaches his or her hand into the enclosed area The interface may also alternatively be a data connection through which a user can connect an interface mechanism to the mobile device, such as a controller, a display, a remote, or other input or output device.

Figure 4:
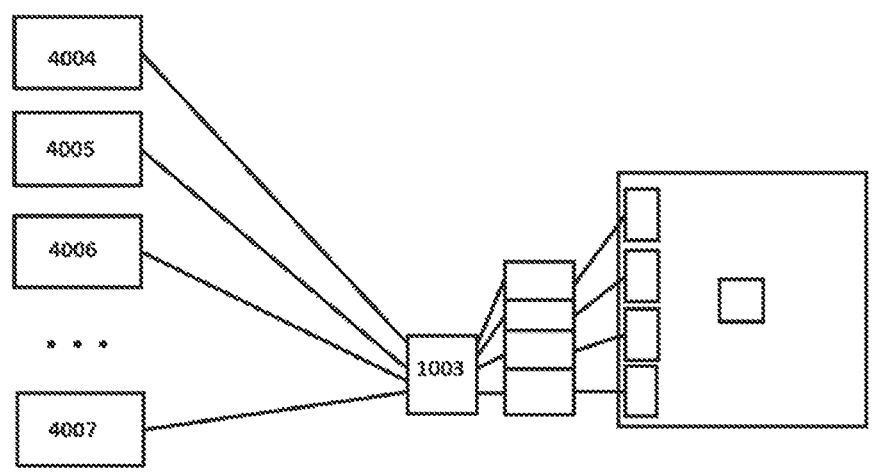
FIG. 4 illustrates an example of a signals database containing information necessary to obfuscate a mobile device's location.

FIG. 4 illustrates an embodiment of the signal database 1003, showing various location-signal-data sources 4004, 4005, 4006, 4007, that provide location signal data to the signal database 1003. For example, one source of location signal data for a geographic location 4004 is collecting the location signal data at the geographic location with one or more devices capable of detecting RF signals and recording the location signal data. Another source of location signal data may be also be generating the data 4005 for a given geographic location based on the location signal data for one or more other geographic locations. If locations of sources of cellular network signals, Wi-Fi signals, Bluetooth signals, and GPS signals are known, location signal data can be predicted without collecting the data. Yet another source of location signal data 4006 may be data stored on the mobile device about locations that the mobile device has previously been and the signals that the mobile device detected at those locations. Further sources of location signal data 4007 may be third-party databases of one or more types of location signal data for geographic locations. The signal database may also include real-time data signal information regarding selected remote locations. For example, one or more mobile devices may be placed at desired remote locations, and these mobile devices may send information regarding the RF signals and signals the mobile devices can detect and interact with at those locations. The signal database may receive this real-time information, and the radio modules may access the real-time signal information seen by a mobile device at a desired remote location in order to generate the replicated RF signals that are then broadcast into the RF-shielded enclosure.

The signal database may be stored on a computer memory implementing a system or method to obfuscate a mobile device's location or stored at another place that is accessible to the computer. For example, the signal database may be stored on a storage device, such as a disk drive, optical storage device, and solid-state storage device such as random access memory ("RAM") or read-only memory ("ROM"), as well as removable media devices, memory cards, flash cards, CD-ROM, DVD, other optical storage media, magnetic cassettes, magnetic tape, magnetic disk storage or other magnetic storage devices, or any other medium which can be used to store the desired information etc. The signal database may also be located on a different computer or server that is accessible over a network, such as a local network or the Internet. The signal database may thus be either local or remote to the radios and the computer implementing a system or method to obfuscate a mobile device's location.

Figure 5:
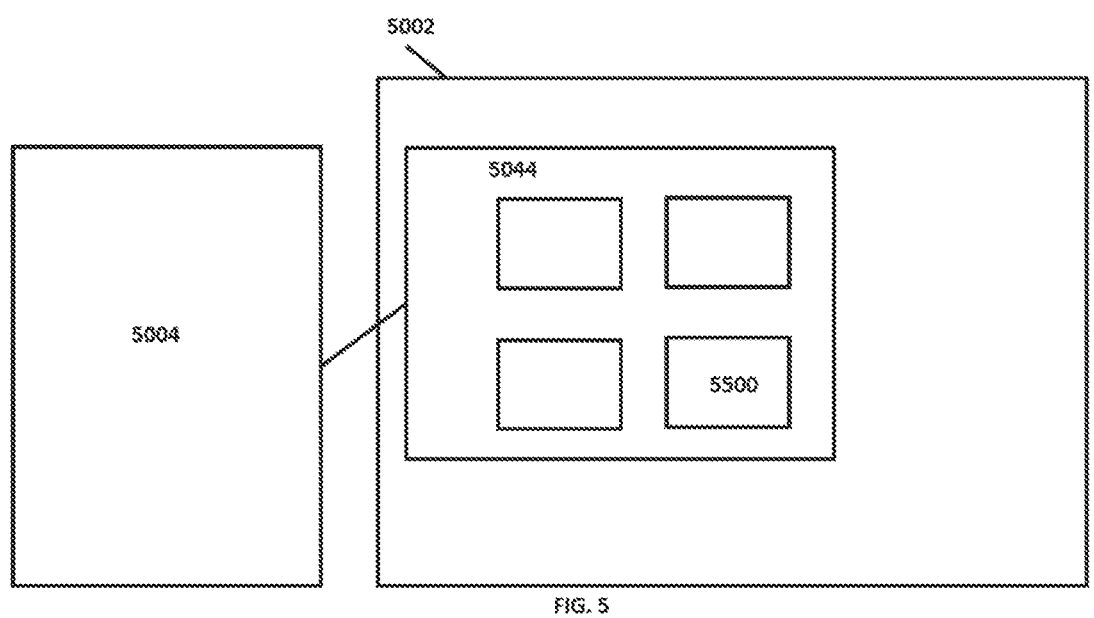
FIG. 5 illustrate an example of an antenna module capable of being used in a system capable of obfuscating a mobile device's location.

FIG. 5 illustrates an antenna module 5044 that may be used as part of a system for obfuscating the location of a mobile device. The antenna module 5044 includes an antenna 5500 capable of broadcasting an RF signal generated by a radio module 5004 connected to the antenna. The RF signal may be a cellular network signal, a Wi-Fi signal, a Bluetooth signal, a GPS signal, or another type of RF signal that a mobile device may use to determine location. The radio module 5004 of FIG. 5 is shown outside an RF enclosure room 5002, but the radio module may also be located within the RF enclosure room or integrated into the wall of the RF enclosure room.

Figure 6:
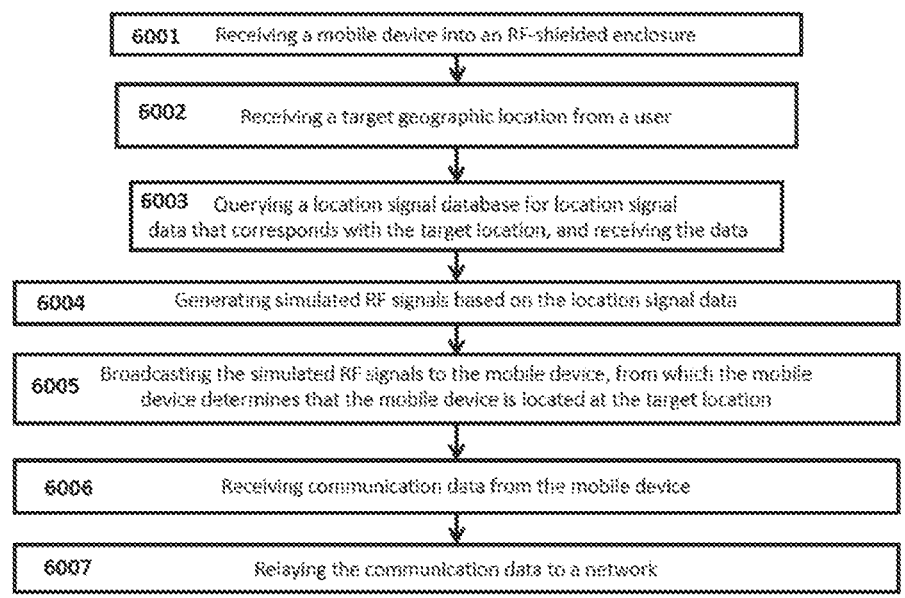
FIG. 6 illustrates a method of obfuscating a mobile device's location.

FIG. 6 illustrates a method of obfuscating the location of a mobile device using the RF enclosure, signal database, radio modules, and antenna modules described herein. The first step in the method is receiving a mobile device into an RF-shielded enclosure, which may be an RF-shielded room, RF-shielded tent, RF-shielded compartment, or other spatial region having RF shielding 6001. Next, a target geographic location is received from a user 6002. The target geographic location may be an address, GPS coordinates, a zip or postal code, a city, a state, or other region. The target geographic location may be a single static location or dynamic, in that the target location changes over time to simulate that the mobile device is moving from one location to another. For example, when the target location is dynamic, the user may select simulating travel between a plurality of locations, including the rate of speed of travel between the locations, the duration of remaining at each location, and the desired route between the plurality of locations. The user may choose a target geographic location after being prompted to select a geographic location from a list of geographic locations for which location signal data is known. Then, a location signal database is queried for location signal data that corresponds with the target location, and location signal data corresponding to the target location is obtained 6003. After that, a radio generates simulated RF signals based on the location signal data and transmits the simulated RF signals to an antenna module 6004. The antenna module receives the simulated RF signals and broadcasts the simulated signals to the mobile device, from which the mobile device determines that the mobile device is located at the target location because the mobile device cannot detect any RF signals apart from the simulated RF signals 6005. The antenna module then receives communication data from the mobile device and transmits the communication data to the radio 6006. The radio then relays the communication data to a network, such as the Internet 6007.

Figure 7:
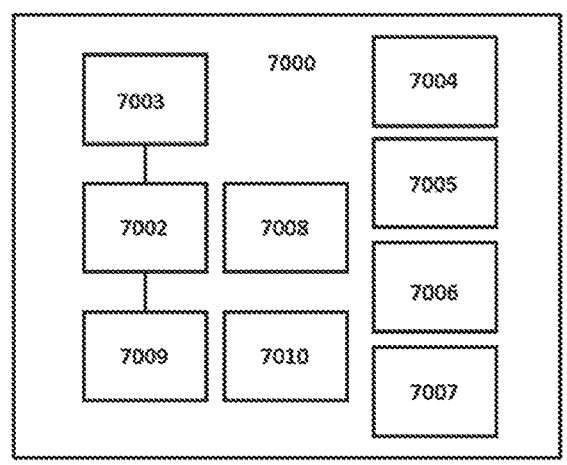
FIG. 7 illustrates a computer that can be used to implement systems and methods of obfuscating a mobile device's location.

FIG. 7 illustrates components of a computer 7000 that can be used to implement systems and methods of obfuscating a mobile device's location. The computer includes a processor 7002 for executing instructions that can be stored in a memory 7003. The device can include many types of memory, data storage, or non-transitory computer-readable storage media, such as a first data storage for program instructions for execution by the processor 7002, a separate storage for images, data, and databases, a removable memory for sharing information with other devices, etc. The memory 7003 may contain a signal database containing location signal data corresponding to various geographic locations. The computer typically will include a display 7009, such as a touch screen or liquid crystal display (LCD). As discussed, the computer may include at least one input element 7010 able to receive input from a user. This input can include a push button, touch pad, touch screen, wheel, joystick, keyboard, mouse, keypad, or any other such element whereby a user can input a command to the computer. In some embodiments, the computer 7000 can include one or more network interface components 7008 for communicating over various networks, such as a Wi-Fi, Bluetooth, RF, wired, or wireless communication systems. The computer 7000 may also include one or more software-defined or hardware-defined radio modules 7004, 7005, 7006, 7007 configured to produce simulated RF signals based on the location signal data contained in a signal database on the memory 7003.

The signal database may be stored on the memory 7003 or at another place that is accessible to the computer 7000. For example, the signal database may be stored on a storage device, such as a disk drive, optical storage device, and solid-state storage device such as random access memory ("RAM") or read-only memory ("ROM"), as well as removable media devices, memory cards, flash cards, CD-ROM, DVD, other optical storage media, magnetic cassettes, magnetic tape, magnetic disk storage or other magnetic storage devices, or any other medium which can be used to store the desired information etc. The signal database may also be located on a different computer or server that is accessible over the network interface components 7008, such as a local network or the Internet. The signal database may thus be either local or remote to the computer 7000 and radios 7004, 7005, 7006, 7007.

Each radio may be configured to produce a different simulated RF signal. For example, one radio 7004 may produce cellular signals, another radio 7005 may produce Wi-Fi signals, yet another radio 7006 may produce Bluetooth signals, and a fourth radio may produce GPS signals. In other embodiments, a single software-defined radio produces all desired types of RF signals. The computer in many embodiments can communicate with a network, such as the Internet, and may be able to communicate with other computers.

What is claimed is:

1. A system for obfuscating a mobile device's location, the system comprising:
    an enclosure configured to block external radio-frequency signals from entering the enclosure, wherein the enclosure is dimensioned to encapsulate a mobile device that is capable of receiving a plurality of radio-frequency signals;

one or more antenna modules contained within the enclosure, the one or more antenna modules configured to broadcast the plurality of radio-frequency signals;

one or more radios configured to generate the plurality of radio-frequency signals, the radios communicatively connected to the antenna modules with a connection and configured to transmit the plurality of radio-frequency signals through the connection to the antenna modules;

a memory including a database of location signal data, the location signal data corresponding to a plurality of radio-frequency signals detected at one or more geographic locations;

an interface configured to receive a selection from a user of a target geographic location from among the one or more geographic locations contained in the database and generate input data;

a processor communicatively connected to the interface, the memory, the one or more radios, and the one or more antenna modules, the processor configured to receive the input data, query the database for target-location signal data, comprising location signal data corresponding to the target geographic location, cause the radio to generate a plurality of target-location radio-frequency signals based on the target-location signal data and transmit the plurality of target-location radio-frequency signals to the one or more antenna modules, and cause the antenna modules to broadcast the plurality of target-location radio-frequency signals to a mobile device encapsulated by the enclosure; and wherein the database is populated in real time by location signal data collected at the target location.

2. The system of claim 1, wherein the enclosure is dimensioned to be carried by an individual person and wherein the enclosure further comprises an enclosure interface configured to enable a user who is outside of the enclosure to operate a mobile device that is inside the enclosure.

3. The system of claim 1, wherein the enclosure comprises a foldable tent.

4. The system of claim 1, wherein the target location is a single geographic location.

5. The system of claim 1, wherein the target location is a plurality of geographic locations, a route between the geographic locations, and the travel speed along the route between the locations.

6. The system of claim 1, wherein the enclosure further comprises RF-shielded ports and the connection comprises a wire passing through the RF-shielded ports.

7. The system of claim 1, wherein the enclosure is a Faraday cage or an anechoic chamber.

8. The system of claim 1, wherein the one or more antenna modules are configured to receive a plurality of radio-frequency signals from the mobile device.

9. A system for obfuscating the locations of one or more mobile devices comprising, a large enclosure; and a plurality of systems of claim 1 contained within the large enclosure.

10. The system of claim 1 further comprising a motion-simulation mechanism for the enclosure.

11. A method for obfuscating a mobile device's location, the method comprising:

receiving a mobile device capable of receiving radio-frequency signals into an enclosure, the enclosure configured to block external radio-frequency signals from entering the enclosure;

receiving a selection from a user of a target geographic location with an interface and generating input data based on the selection;

receiving the input data with a processor;

querying a database of location signal data with the processor based on the input data for target-location signal data, comprising location signal data corresponding to the target geographic location;

retrieving the target-location signal data from the database with the processor;

generating a plurality of target-location radio-frequency signals based on the target-location signal data with one or more radios communicatively connected to the processor;

transmitting the plurality of target-location radio-frequency signals from the one or more radios with a communicative connection to one or more antenna modules capable of broadcasting radio-frequency signals within the enclosure;

broadcasting the plurality of target-location radio-frequency signals from the one or more antenna modules to the mobile device; and wherein the target-location signal data is data collected by one or more radio-frequency sensors located at the target geographic location and transmitted to the location signal database in real time.

12. The method of claim 11, further comprising receiving a plurality of radio-frequency signals containing communication data with the antenna modules from the mobile device.

13. The method of claim 12, further comprising relaying the communication data to a network.

14. The method of claim 11, further comprising simulating motion of the mobile device through the use of a motion-simulation mechanism of the enclosure.

* * * * *